US010515115B2

(12) United States Patent
Maggio et al.

(10) Patent No.: US 10,515,115 B2
(45) Date of Patent: Dec. 24, 2019

(54) SYSTEM AND METHOD FOR CLOSED-CIRCUIT TELEVISION FILE ARCHIVAL AND COMPRESSION

(71) Applicants: Thomas Maggio, Farmingdale, NY (US); Michael Biordi, Farmingdale, NY (US)

(72) Inventors: Thomas Maggio, Farmingdale, NY (US); Michael Biordi, Farmingdale, NY (US)

(73) Assignee: PROACTIVE CCTV, Farmingdale, NY (US)

( * ) Notice: Subject to any disclaimer, the term of this patent is extended or adjusted under 35 U.S.C. 154(b) by 0 days.

(21) Appl. No.: 15/910,125

(22) Filed: Mar. 2, 2018

(65) Prior Publication Data
US 2018/0253492 A1 Sep. 6, 2018

Related U.S. Application Data

(60) Provisional application No. 62/466,568, filed on Mar. 3, 2017.

(51) Int. Cl.
*G06F 7/00* (2006.01)
*G06F 17/30* (2006.01)
(Continued)

(52) U.S. Cl.
CPC ............ *G06F 16/71* (2019.01); *G06F 16/113* (2019.01); *G06F 16/1744* (2019.01)

(58) Field of Classification Search
CPC ......... G06F 17/30858; G06F 17/30073; G06F 17/30153; G06F 16/71; G06F 16/113; G06F 16/1744
(Continued)

(56) References Cited

U.S. PATENT DOCUMENTS 6,757,008 B1 6/2004 Smith
7,339,993 B1* 3/2008 Brooks .......... H04N 21/440263
375/240.1
(Continued)

FOREIGN PATENT DOCUMENTS

CN 102231117 A 11/2011
EP 1453311 A2 9/2004
(Continued)

OTHER PUBLICATIONS

"International Search Report and the Written Opinion of the International Searching Authority", dated Aug. 30, 2018 (7 Pages).

*Primary Examiner* — Md I Uddin
(74) *Attorney, Agent, or Firm* — Gearhart Law LLC (57) ABSTRACT

Systems and methods for compressing and decompressing video files are provided. The system includes a digital recording device configured to transfer a digital video feed to a computing device. The system can be applied to the archival and compression of closed-circuit television (CCTV) files. The system includes hardware configured to store and read machine readable instructions. The machine readable instructions-cause the processor to access the digital video feed, extract a series of image files from the digital video feed, organize image files from the series of image files into a grouping of image files, compress the grouping of image files into a singular compressed file, decompress the singular compressed file, extract the number of image files from the decompressed file, and organize the extracted number of image files into a playable video file. The compression may involve use of the Lempel-Ziv-Markov chain algorithm 2 (LZMA2) compression method.

11 Claims, 4 Drawing Sheets

(51) Int. Cl.
*G06F 16/71* (2019.01)
*G06F 16/11* (2019.01)
*G06F 16/174* (2019.01)

(58) Field of Classification Search
USPC .............................. 707/639, 736, 737, 756
See application file for complete search history.

(56) References Cited

U.S. PATENT DOCUMENTS

| | | | |
|---|---|---|---|
| 7,649,938 | B2 | 1/2010 | Chen et al. |
| 7,907,665 | B2 | 3/2011 | Wells et al. |
| 8,755,837 | B2 | 6/2014 | Rhoads et al. |
| 8,896,694 | B2 | 11/2014 | O'Donnell et al. |
| 8,953,044 | B2 | 2/2015 | Wu et al. |
| 9,204,038 | B2 | 12/2015 | Lord et al. |
| 9,330,722 | B2 | 5/2016 | Chang et al. |
| 9,967,234 | B1* | 5/2018 | Crane ..................... H04L 63/02 |
| 2002/0015532 | A1* | 2/2002 | Kostrzewski ........... G06T 9/001 |
| | | | 382/243 |
| 2003/0152145 | A1 | 8/2003 | Kawakita |
| 2004/0045030 | A1* | 3/2004 | Reynolds ............... H04L 29/06 |
| | | | 725/110 |
| 2004/0068583 | A1 | 4/2004 | Monroe et al. |
| 2004/0179600 | A1 | 9/2004 | Wells et al. |
| 2009/0165067 | A1* | 6/2009 | Bruckman .......... H04L 65/4076 |
| | | | 725/110 |
| 2009/0201372 | A1 | 8/2009 | O'Doherty et al. |
| 2009/0324064 | A1* | 12/2009 | Nakamura ............. H04N 19/63 |
| | | | 382/164 |
| 2011/0115914 | A1 | 5/2011 | Bailey et al. |
| 2011/0187858 | A1 | 8/2011 | Wang et al. |
| 2013/0088600 | A1 | 4/2013 | Wu et al. |
| 2013/0128988 | A1* | 5/2013 | Rajagopalan .......... H04N 19/61 |
| | | | 375/240.25 |
| 2013/0342357 | A1* | 12/2013 | Li .......................... G08C 19/00 |
| | | | 340/870.01 |
| 2015/0271453 | A1 | 9/2015 | Chuang et al. |
| 2016/0314590 | A1* | 10/2016 | Lin ..................... G06K 9/00771 |
| 2017/0213081 | A1* | 7/2017 | Nathan .............. G06K 9/00369 |
| 2017/0230485 | A1* | 8/2017 | Sulieman ............. H04L 69/04 |
| 2017/0237996 | A1* | 8/2017 | Schneider ............ H04N 19/184 |
| | | | 382/168 |
| 2017/0300786 | A1* | 10/2017 | Gope ................. G06K 9/00791 |

FOREIGN PATENT DOCUMENTS

| | | |
|---|---|---|
| WO | 9819450 A2 | 5/1998 |
| WO | 2017008125 A1 | 1/2017 |

* cited by examiner

SYSTEM AND METHOD FOR CLOSED-CIRCUIT TELEVISION FILE ARCHIVAL AND COMPRESSION

CLAIM OF PRIORITY

This application is a United States non-provisional application and claims priority to U.S. Provision Patent Application No. 62/466,568, filed Mar. 3, 2017, and herein incorporated by referenced in its entirety.

FIELD OF THE EMBODIMENTS

This field of embodiments relates to video compression and, in particular, to a system and method for closed-circuit television file archival and compression.

BACKGROUND OF THE EMBODIMENTS

Digital recording devices have long been used as security cameras and have, in recent times, also become standard personal recording technology. To store media saved using digital recording devices, companies and individuals must possess enough storage capacity to store all of the files recorded using these devices.

Regarding security cameras and other similar monitoring cameras, the amount of storage needed to save video data files increases as resolution increases and the length of the video increases. An efficient and user-friendly method of decreasing the amount of storage needed to store data files recorded using digital recording devices, with the ability to easily access and play back the files, is thus needed.

Examples of related art are described below:

U.S. Pat. No. 6,757,008 generally describes a linescan camera is used in conjunction with a mechanical scanning mechanism to acquire high-resolution images of an area under video surveillance. The video signal from the linescan camera is converted into a digital data stream, compressed, and stored in a digital memory. Under control of an operator, full-field images are selectively recalled from the digital memory and converted to a lower resolution for display on a monitor. The operator selects a region-of-interest from the full-field display through the use of a computer pointing device, such as a mouse. The selected area is then displayed on the monitor in its full acquired resolution, thereby allowing the operator to view high-resolution images of a large area under surveillance.

U.S. Pat. No. 7,649,938 generally describes an apparatus, a method, and a software product to control a plurality of surveillance video camera/encoder combinations. The method includes receiving a plurality of encoded video streams from a respective surveillance camera/encoder combination, and accepting a measure of the level of activity for each encoded video stream. Each measure is obtained from the output of the camera of the corresponding camera/encoder combination. The method further includes assigning output bit rates for each encoded stream according to the accepted level of activity such that a maximum overall bit rate is not exceeded. One version is for controlling camera/encoder combinations that accept remote bit rate control, and a second is for controlling camera/encoder combinations that send at a pre-set bit rate. One version includes a network connection between the camera/encoder combinations, and the method or apparatus for central control.

U.S. Pat. No. 7,907,665 generally describes an apparatus generally comprising an input circuit, a storage circuit and an output circuit. The input circuit may be configured to generate a first intermediate signal from a plurality of input video signals. The storage circuit may be configured to (i) organize the first intermediate signal into a plurality of sequences each related to one of the input video signals and (ii) generate a second intermediate signal from the sequences. The output circuit may be configured to generate an output video signal by compressing the second intermediate signal.

U.S. Pat. No. 8,755,837 generally relates to cell phones and other portable devices equipped with a variety of technologies. Some aspects relate to data driven imaging architectures, in which a cell phone's image sensor is one in a chain of stages that successively act on packetized instructions/data, to capture and later process imagery. Other aspects relate to distribution of processing tasks between the device and remote resources ("the cloud"). Elemental image processing, such as filtering and edge detection—and even some simpler template matching, operations—may be performed on the cell phone. Other operations are referred out to remote service providers. The remote service providers can be identified using techniques such as a reverse auction, though which they compete for processing tasks. Other aspects of the disclosed technologies relate to visual search capabilities, and determining appropriate actions responsive to different image inputs. Still others concern metadata generation, processing, and representation. Yet others relate to coping with fixed focus limitations of cell phone cameras, e.g., in reading digital watermark data. Still others concern user interface improvements. A great number of other features and arrangements are also detailed.

U.S. Pat. No. 8,896,694 generally describes a wearable digital video camera equipped with wireless connection protocol and global navigation and location positioning system technology to provide remote image acquisition control and viewing. The Bluetooth® packet-based open wireless technology standard protocol is preferred for use in providing, control signals or streaming data to the digital video camera and for accessing image content stored on or streaming from the digital video camera. The UPS technology is preferred for use in tracking of the location of the digital video camera as it records image information. A rotating mount with a locking member on the camera housing allows adjustment of the pointing angle of the wearable digital video camera when it is attached to a mounting surface.

U.S. Pat. No. 8,953,044 generally describes a video-based analysis system that detects, tracks and archives vehicles in video stream data at multiple resolutions. The system includes an image capturing device that captures video stream data having video at a first high resolution. A vehicle detection module detects at least one vehicle within the video. A vehicle analysis module is configured to analyze the video and to extract one or more key vehicle features from the video to enable identification of a vehicle of interest (VOI) according to a set of predetermined criteria. A subsampling module creates a reduced resolution video stream in a second subsampled resolution that is lower than the first high resolution while maintaining the one or more extracted key features within the reduced resolution video stream in the first high resolution, and archives the reduced resolution video stream into a video database.

U.S. Pat. No. 9,204,038 generally describes cell phones and other portable devices equipped with a variety of technologies. Some aspects relate to imaging architectures, in which a cell phone's image sensor is one in a chain of stages that successively act on instructions/data, to capture and later process imagery. Other aspects relate to distribution of processing tasks between the device and remote resources ("the cloud"). Elemental image processing, such as filtering and edge detection—and even some simpler template matching operations—may be performed on the cell phone. Other operations are referred out to remote service providers. The remote service providers can be identified using techniques such as a reverse auction, through which they compete for processing tasks. Other aspects of the disclosed technologies relate to visual search capabilities, and determining appropriate actions responsive to different image inputs. Still others concern metadata generation, processing, and representation. A great number of other features and arrangements are also detailed.

U.S. Pat. No. 9,330,722 generally describes a system and method for editing and parsing compressed digital information. The compressed digital information may include visual information which is edited and parsed in the compressed domain. In a preferred embodiment, the present invention provides a method for detecting moving objects in a compressed digital bitstream which represents a sequence of fields or frames of video information for one or more captured scenes of video.

U.S. Patent Application No. 2004/0068583 generally describes an image collection, distribution and management system employs wherein multiple compression at the source, permitting various signals to be distributed via a network, depending on the functional aspects of the signal, as well as on the bandwidth capacity of the chosen distribution path or network. Enhanced decompression schemes in the receiving systems further improve the overall efficiency and quality of the transmitted signals. Time stamps are appended to each discrete file to facilitate reproduction of the individual files in the sequence. Further, when transmission of the file through typical communications networks involves significant and variable delay in transmission, the time stamps provide a means for the reproducing device to display each individual file in correct temporal sequence. The time stamp represents the time at which the file was captured, as measured by a suitable time base inside the source. This time base may be provided by the source operating system. Alternatively, the time stamp may be derived from a running count of the incoming frames from the source. The system also supports communications networks having widely differing, non-interoperable protocols. This expands the utility of these disparate networks as media for conveying compressed file sequences.

U.S. Patent Application No. 2004/0179600 generally describes an apparatus generally comprising an input circuit, a storage circuit and an output circuit. The input circuit may be configured to generate a first intermediate signal from a plurality of input video signals. The storage circuit may be configured to (i) organize the first intermediate signal into a plurality of sequences each related to one of the input video signals and (ii) generate a second intermediate signal from the sequences. The output circuit may be configured to generate an output video signal by compressing the second intermediate signal.

U.S. Patent Application No. 2011/0115914 generally describes a real-time Event Processing System (EPS) for processing a sequence of events generated by one or more pieces of hardware. The Event Processor collects data generated by the several transducers or appliances as they communicate with the server platform to indicate user activity of the attached hardware. As a packet data is received from one of the appliances, the data is date and time stamped and stored in anticipation of the next data event to which it can be paired or compared with. Stored event data is compared to a template of normalized data results to see if the event data was normal or abnormal. If the event data as compared was normal, no action is taken beyond storing said data. If the stored data is determined to be outside the pre-determined or pre-assigned data range, then a video camera captures the user activity just proceeding, during, and subsequent to the event for a short duration (such as a 1 minute duration), such that the stored video can later be viewed and interrogated to determine what actions) caused the unacceptable event.

U.S. Patent Application No. 2013/0088600 generally describes a video-based analysis system that detects, tracks and archives vehicles in video stream data at multiple resolutions. The system includes an image capturing device that captures video stream data having video at a first high resolution. A vehicle detection module detects at least one vehicle within the video. A vehicle analysis module is configured to analyze the video and to extract one or more key vehicle features from the video to enable identification of a vehicle of interest (VOI) according to a set of predetermined criteria. A subsampling module creates a reduced resolution video stream in a second subsampled resolution that is lower than the first high resolution while maintaining the one or more extracted key features within the reduced resolution video stream in the first high resolution, and archives the reduced resolution video stream into a video database.

U.S. Patent Application No. 2015/0271453 generally describes Imaging System for Immersive Surveillance (ISIS) the combines multiple cameras in one device. When properly mounted, example ISIS systems offer up to 360-degree, 240-megapixel views on a single screen. (Other fields of view and resolutions are also possible.) Image-stitching software merges multiple video feeds into one scene. The system also allows operators to tag and follow targets, and can monitor restricted areas and sound an alert when intruders breach them.

Chinese Patent Publication No. CN105844416A generally describes a comprehensive data management system for substation equipment failure defect for analysis, including integrated information knowledge base, intelligent data processing module, intelligent diagnostic module. Comprehensive information in a repository of various equipment fault defect diagnosis rule base, and related equipment Information, test data and historical site detection diagnostic procedures resulting in the establishment of the case base, China Unicorn journal articles, standards, electricity results, expert database, etc. database and device status evaluation system, provide cross-platform integrated information retrieval interfaces; intelligent data processing module for on-site detection of data classification, compression, conversion and other processing, easy retrieval and browsing; intelligent diagnosis module depth learning algorithm based on the establishment for equipment operation and detection information identification and diagnosis, the preliminary judging device failure types, and the type of fault through the device and automatically retrieve and match experts call via a data network specialist to enter the diagnostic platform.

European Patent Publication No. EP1453311A2 generally describes a flexible video information storage and analysis apparatus stores a video information data base and a plurality of moving image content analysis algorithms for analyzing the video information in the data base. A user can manipulate a mouse to select one of the analysis algorithms. The selected algorithm is used to analyze video information in the data base. The apparatus records and displays plural streams of video information. Content analysis algorithms may be downloaded from a remote location. The apparatus takes appropriate actions in response to detected features in incoming video streams. Tile-based conditional-refresh video data compression is employed. A support structure efficiently supports several record-medium drive units. A tape back-up drive serves as an archiving mechanism for video data stored on hard disks. Recording of incoming video, and archiving and displaying of stored video, all proceed simultaneously.

South Korean Patent Publication No. KR1020160136467A generally describes mobile phones and other portable devices equipped with a variety of technologies. Some aspects relate to visual search capabilities, and determining appropriate actions responsive to different image inputs. Others relate to processing of image data. Still others concern metadata generation, processing, and representation. Yet others concern user interface improvements. Other aspects relate to imaging architectures, in which a mobile phone's image sensor is one in a chain of stages that successively act on packetized instructions/data, to capture and later process imagery. Still other aspects relate to distribution of processing tasks between the mobile device and remote resources ("the cloud"). Elemental image processing (e.g., simple filtering and edge detection) can be performed on the mobile phone, while other operations can be referred out to remote service providers. The remote service providers can be selected using techniques such as reverse auctions, through which they compete for processing tasks. A great number of other features and arrangements are also detailed.

International Patent Publication No. WO9819450A2 generally describes a flexible video information storage and analysis apparatus that stores a video information data base and a plurality of moving image content analysis algorithms for analyzing the video information in the data base. A user can manipulate a mouse to select one of the analysis algorithms. The selected algorithm is used to analyze video information in the data base. The apparatus records and displays plural streams of video information. Content analysis algorithms may be downloaded from a remote location. The apparatus takes appropriate actions in response to detected features in incoming video streams. Tile-based conditional-refresh video data compression is employed. A support structure efficiently supports several record-medium drive units. A tape back-up drive serves as an archiving mechanism for video data stored on hard disks. Recording of incoming video, and archiving and displaying of stored video, all proceed simultaneously.

International Patent Publication No. WO2017008125A1 generally describes a machine-implemented method of packing volumetric image data executed by at least one processing device, the method comprising: determining a first block size; writing to memory a first block of image data from a first image, the first block having the first block size; determining a second block size; and writing to memory a second block of image data from a second image, the second block having the second block size; wherein the first image contains X by Y pixels of one of color data and depth data, and the second image contains X by Y pixels of the other of color and depth data; and wherein the first image is related to the second image. Embodiments also relate to methods of unpacking volumetric image data. Further embodiments relate to systems and computer-readable media storing or having access to code to execute the packing and unpacking methods.

None of the art described above addresses all of the issues that the present invention does.

SUMMARY OF THE EMBODIMENTS

According to one aspect of the present invention, a system for compressing and decompressing video files is provided. The system includes a digital recording device configured to transfer a digital video feed to a computing device. The system further includes the computing device, wherein the computing device includes a graphical user interface, a processor, and a computer readable non-transitory storage medium for tangibly storing thereon machine readable instructions, the machine readable instructions when executed by the processor, cause the processor to perform the steps of accessing the digital video feed, extracting a series of image files from the digital video feed, organizing a number of image files from the series of image files into a grouping of image files, compressing the grouping of image files into a singular compressed file, decompressing the singular compressed file, creating a decompressed file, extracting the number of image files from the decompressed file, and organizing the extracted number of image files into a playable video file.

According to another aspect of the present invention, a method for compressing and decompressing video files is provided. The method includes recording, using a digital recording device, a digital video feed, transferring the digital video feed to a server, accessing, using a processor coupled to the server, the digital video feed, extracting, using the processor, a series of image files from the digital video feed, organizing a number of image files from the series of image files into a grouping of image files, and compressing, using the processor, the grouping of image files into a singular compressed file. The method further includes decompressing, using the processor, the singular compressed file, thus creating a decompressed file, extracting the number of image files from the decompressed file, and organizing the extracted number of image files into a playable video file.

It is an object of the present invention to provide the system, wherein the machine readable instructions when executed by the processor, cause the processor to further perform the steps of creating a file index database, and organizing the series of image files from the digital video feed within the file index database.

It is an object of the present invention to provide the system, wherein the computing device uses a Lempel-Ziv-Markov chain algorithm 2. (LZMA2) compression method.

It is an object of the present invention to provide the system, wherein the graphical user interface is configured to enable a user to select a file type for the series of image files.

It is an object of the present invention to provide the system, wherein the graphical user interface is configured to enable a user to edit the digital video feed using criteria selected from the group consisting of image quality, image resolution, and frames per second.

It is an object of the present invention to provide the system, wherein the grouping of image files constitutes a number of images corresponding to approximately five minutes of the digital video feed.

It is an object of the present invention to provide the system, wherein the machine readable instructions when executed by the processor, cause the processor to further perform the step of archiving the singular compressed file in a database located on a server.

It is an object of the present invention to provide the system, therein the server is remote from the computing device.

It is an object of the present invention to provide the system, wherein the digital video feed is a Real Time Streaming Protocol (RTSP) feed.

It is an object of the present invention to provide the system, wherein the machine readable instructions when executed by the processor, cause the processor to further perform the step of playing, on the graphical user interface, the playable video file from the extracted number of image files.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
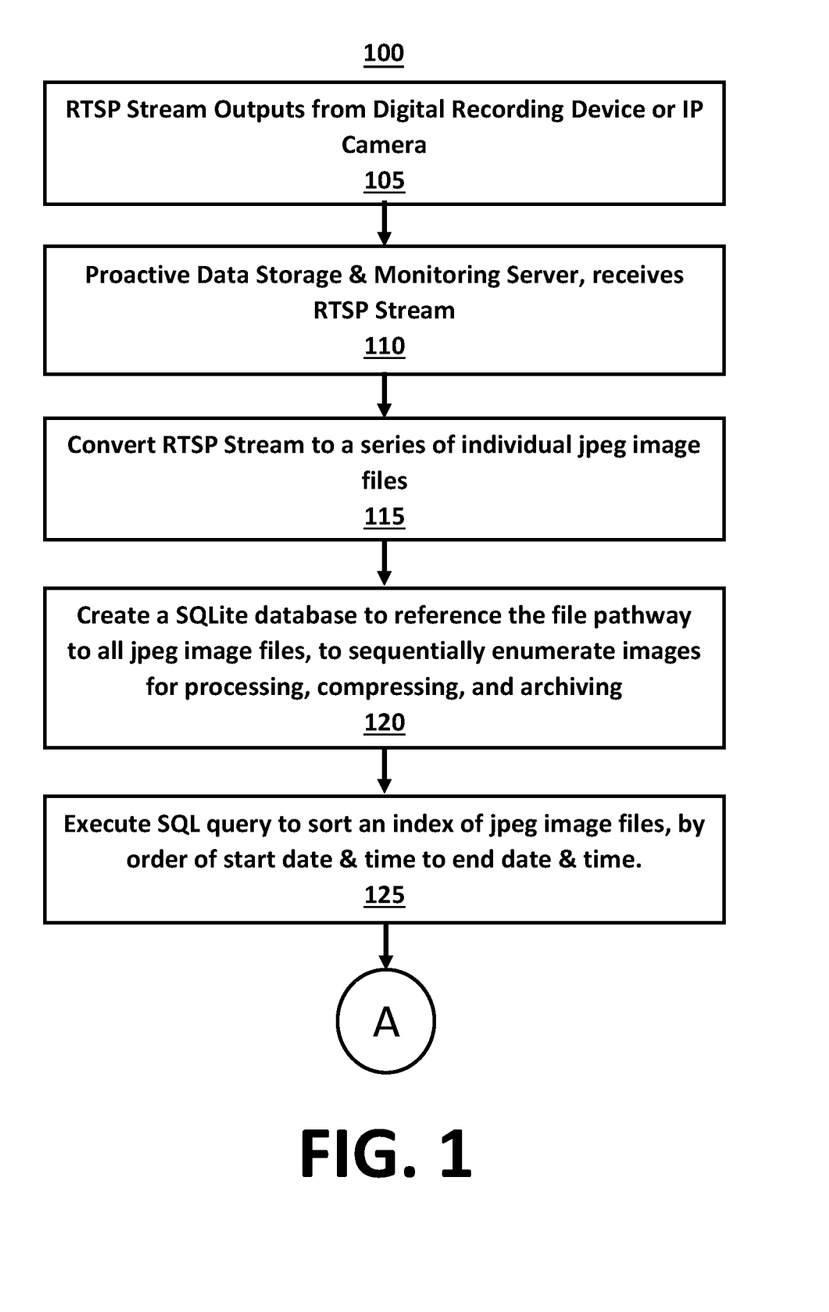
FIGS. 1-2 show a flowchart of a method of closed-circuit television (CCTV) file archival and compression, according to an embodiment of the present invention.
Figure 2:
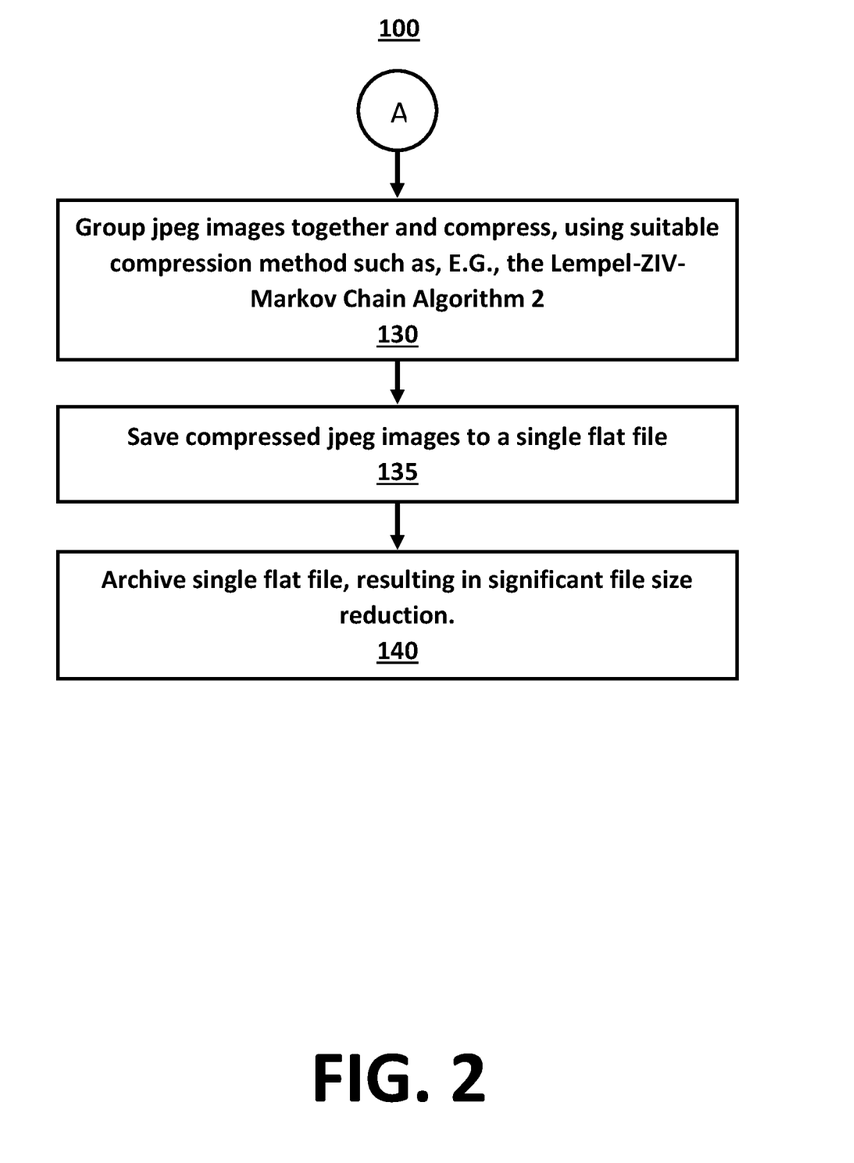

Referring now to FIGS. 1-2, a method 100 of closed-circuit television (CCTV) file archival and compression is illustratively depicted, in accordance with an embodiment of the present invention.

At step 105, a camera or other suitable recording device records data. (e.g., audio, video, etc.). According to an embodiment, the recording device may be, e.g., a digital video recorder, a network video recorder, an Internet Protocol (IP) camera, etc. According to an embodiment, the recording device has the capability to transmit a Real Time Streaming Protocol (RTSP) feed to a server. According to an embodiment, the recording device has the capability of transmitting one or more pre-recorded files to a server.

At step 110, the recording device transmits a RTSP feed to a server. According to an embodiment, the server is a Windows-based personal computer (PC) that includes relevant file archival and compression software. According to an embodiment, the software receives the incoming RTSP feed.

At step 115, the incoming RTSP feed is converted into one or more image files using the software. According to an embodiment, the image files are .jpeg files, .png files, and/or any other suitable image file type. According to an embodiment, a user selects the image file type into which the RTSP feed is to be converted. According to an embodiment, if the feed is of a video file, the video is separated into a series of frames, wherein each frame is converted into an image file. According to an embodiment, a user is able to set the number of frames per second into which the video file is to be separated.

At step 120, a file index database is created. According to an embodiment, the file index database includes all of the individual image files that need to be processed, compressed, and archived using the software.

At step 125, the file index database is searched for any image files that are to be processed by the software. According to an embodiment, processing may include reducing the resolution size of the individual images, altering the frames per second of the input video (if the input is a video), altering the image quality of the individual images, cropping the individual images, and/or any other suitable processing techniques that are in conformity with the spirit of the present invention.

At step 130, images are grouped together and compressed. According to an embodiment, if enough images are available, the images are grouped into groupings of images that collectively create approximately five minutes worth of video. According to an embodiment, the images are compressed using Lempel-Ziv-Markov chain algorithm 2 (LZMA2) compression method. It is noted, however, that other suitable file compression methods may also be used while maintaining the spirit of the present invention.

At step 135, after the images to be compressed have been successfully compressed, the compressed image files are saved as a single file, having a singular file extension. According to an embodiment, the single file has a "pro" file extension. It is noted, however, that other suitable file extensions may also be used, while maintaining the spirit of the present invention.

At step 140, the compressed file is sent to a server for archival. According to an embodiment, the file is sent to a hard drive inside the server. According to another embodiment, the file is sent to an offsite server.

Figure 3:
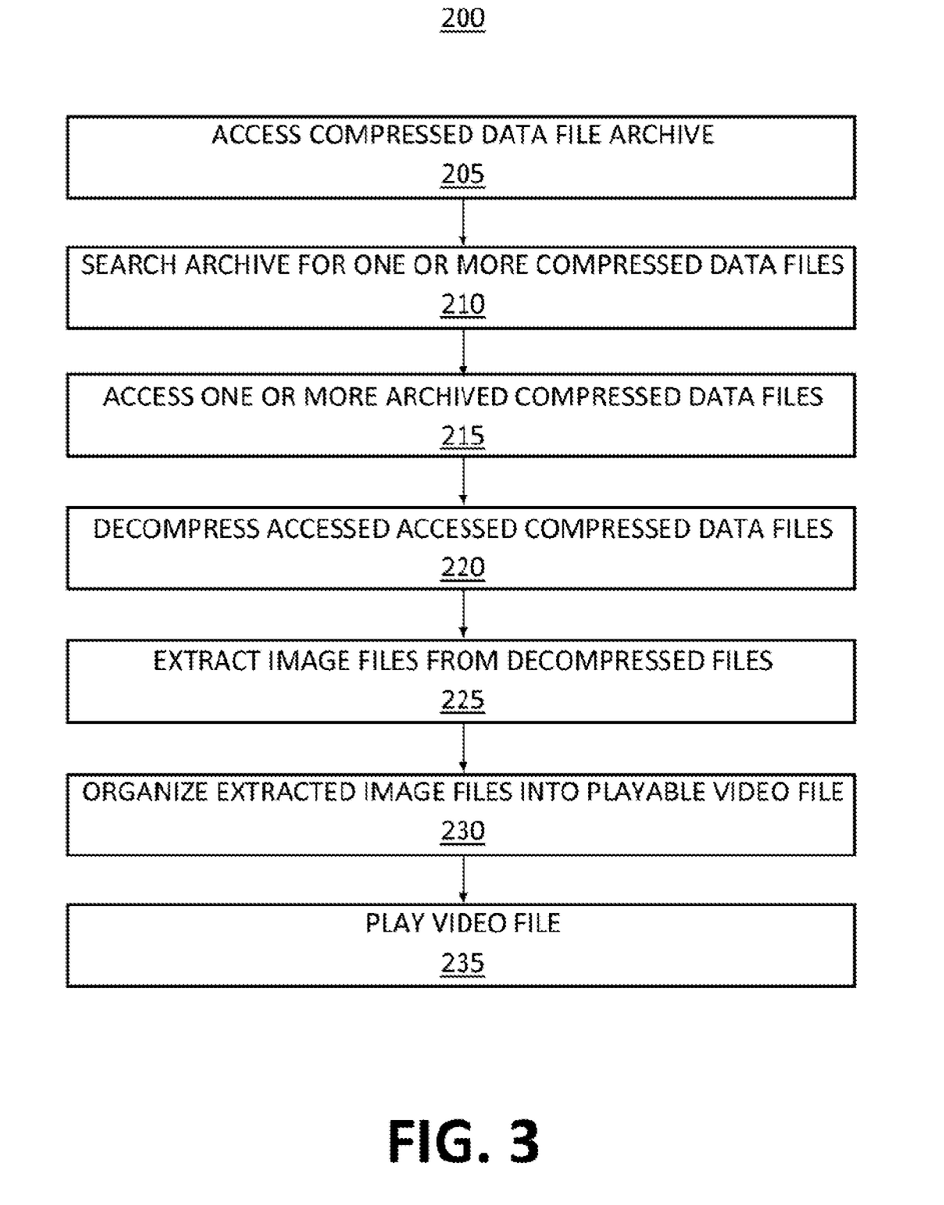
FIG. 3 shows a flowchart of a method of CCTV client-side decompression, according to an embodiment of the present invention.

Referring now to FIG. 3, a method 200 of CCTV client-side decompression is illustratively depicted, in accordance with an embodiment of the present invention.

Once the files are compressed and archived according to the method 100 describes in FIGS. 1-2, the files can once against be played back following a decompression method 200. Once decompressed, a user is capable of playing back the reconstructed video. According to an embodiment, the reconstructed video is of approximately the same quality as the series of image files prior to compression at step 130.

As step 205, the archive of compressed data files is accessed by the software. The archive is searched, at step 210, for one or more particular archived compressed tiles. According to an embodiment, the search includes a date and/or time search. It is noted, however, that other types of searches may also be performed.

At step 215, one or more searched-for files, once located, is accessed by the software. The accessed file (or files) is then decompressed, at step 220. According to an embodiment, software uses a LZMA2 decompression method. It is noted, however, that other methods of decompression may also be used while maintaining the spirit of the present invention.

At step 225, if the original file contained one or more images, the images are extracted from the decompressed file. At step 230, the extracted images are organized into a playable video file. At step 235, the playable video file is played back in a sequence, enabling a user to video the reconstituted video tile. According to an embodiment, the reconstituted video file is played to the user on a graphical user interface.

According to an embodiment, the software includes a graphical user interface that enables a user access video and image files prior to and/or after compression and/or decompression. According to an embodiment, the graphical user interface enables a user to edit video and/or image and/or audio files prior to compression and/or decompression.

Figure 4:
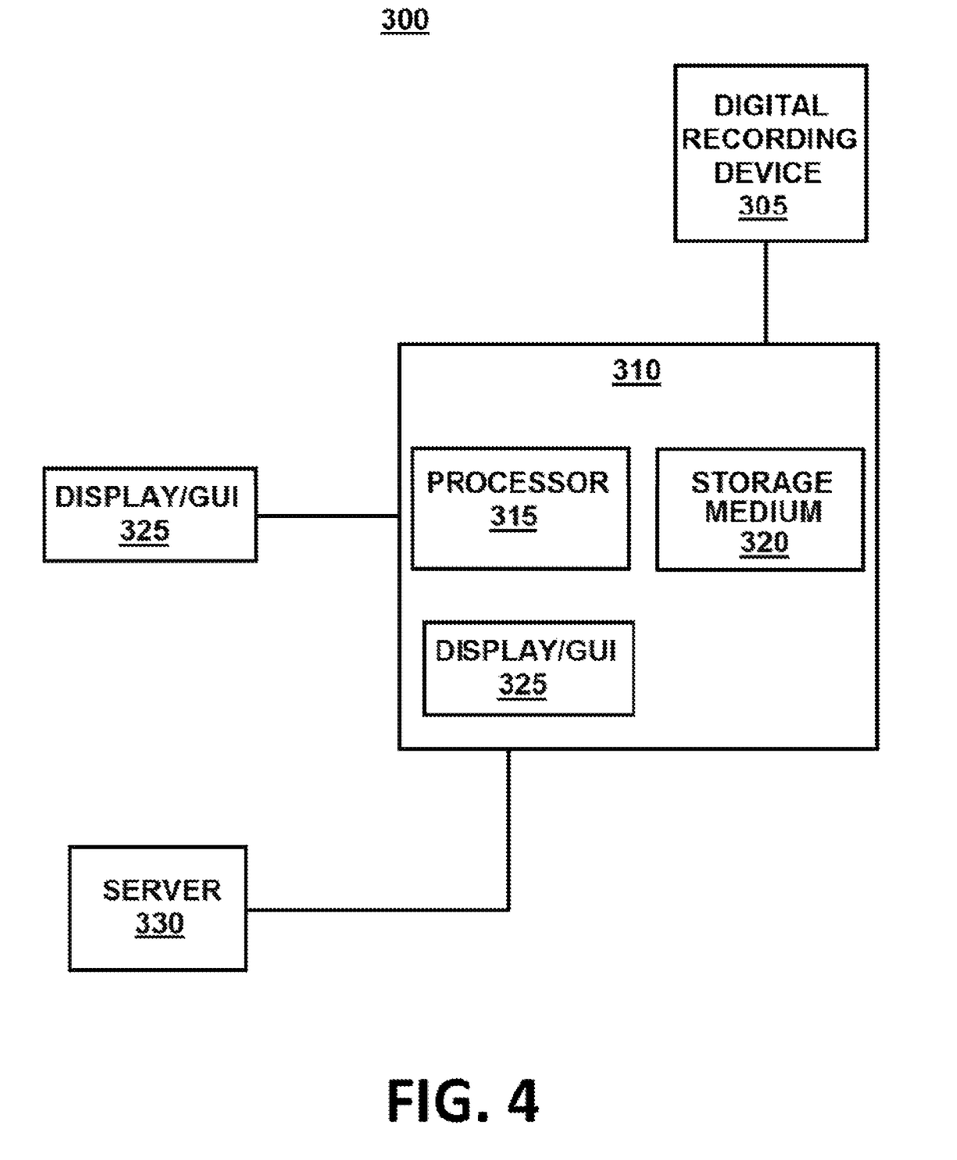
FIG. 4 shows a block diagram of a system for CCTV file archival, compression, and decompression, according to an embodiment of the present invention.

Referring now to FIG. 4, a block diagram of a system 300 for CCTV file archival, compression, and decompression is illustratively depicted, in accordance with an embodiment of the present invention.

According to an embodiment, the system 300 includes a digital recording device 305, a computing device 310, and a display 325.

The digital recording device 305 is coupled to the computing device 310 and is configured to transfer a digital video feed to the computing device 310. The digital recording device 305 may be coupled to the computing device 310 either wirelessly or through a wireless connection.

According to an embodiment, one or more computing devices 310 may be used, wherein each of the one or more computing devices 310 performs one or more of the steps described in FIGS. 1-3. According to an embodiment, each computing device 310 includes one or more processors 315.

According to an embodiment, the computing device 310 includes at least one processor 315 and at least one storage medium 320. The computing device 310 may include a graphical user interface (which may be incorporated into display 325) and/or a graphical user interface may be coupled to the computing device 310. According to an embodiment, the computing device 310 includes a computer readable non-transitory storage medium 320 for tangibly storing thereon machine readable instructions. According to an embodiment, the machine readable instructions, when executed by the processor 315, cause the processor 315 to perform any or all of the steps described in the methods shown in FIGS. 1-3.

According to an embodiment, the digital recording device 305 records data (e.g., audio, video, etc.). According to an embodiment the digital recording device 305 may be, e.g., a digital video recorder, a network video recorder, an IP camera, etc. According to an embodiment, the digital recording device 305 has the capability to transmit a RTSP feed to a server, which may include the computing device 310 or a remote server 330. The remote server 330 may be coupled to the computing device 310 either wirelessly or through a wired connection.

According to an embodiment, the server is the computing device and is a Windows-based PC that includes relevant file archival and compression software. According to an embodiment, the software receives the incoming RTSP feed.

According to an embodiment, the storage medium 320 is configured to store one or more files and/or folders that includes, but is not limited to, the original digital video feed, file index database (including the individual image files stored in the file index database), the archived compressed files, the decompressed files, the reconstituted video files, software designed to enable the processor 315 to perform any or all of the steps shown in FIGS. 1-3, etc.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and, or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.) laptop computer(s) notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and intemperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n. Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Inters MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA") and/or the like embedded technology. For example, any of the component collection (distributed or otherwise) and/or features of the present invention may be implemented via the microprocessor and/or via embedded components; e.g., via. ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks" and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-Chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA) Micro Channel Architecture (MCA), NuBus, Peripheral Component Interconnect (Extended) (PCI(X)), PCI Express, Personal Computer Memory Card International Association (PCMCIA) and/or the like.

Storage interfaces may accept, communicate and/or connect to a number of storage devices such as, but not limited to: storage devices, removable disc devices, and/or the like. Storage interlaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and: or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (PO) may accept, communicate, and/or connect to user input devices, peripheral devices, cryptographic processor devices, and/or the like. I/O may employ connection protocols such as, but not limited to: audio: analog, digital, monaural. RCA, stereo, and/or the like; data: Apple Desktop Bus (ADB), IEEE 1394a-b serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video VGA, and/or the like; wireless transceivers: 802.11a/big/nix; Bluetooth; cellular (e.g., code division multiple access (CDMA), high speed packet access (HSPA (+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices and the like may be connected and/or communicate to I/O and/or other facilities of the like such as network interfaces, storage interfaces, directly to the interface bus, system bus, the CPU, and/or the like. Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible, technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server components) (information server); user interface component(s) (user interface); Web browser component(s) (Web browser); database(s) mail server component(s); mail client component(s); cryptographic server component(s) (cryptographic server) and/or the like (i.e., collectively a component collection). These components m y be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP), HyperText Transfer Protocol (HTTP); Secure Hypertext Transfer Protocol (HTTPS), Secure Socket Layer (SSL), messaging protocols (e.g., America Online (AOL) Instant Messenger (AIM) Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., jabber or Open Mobile Alliance's (OMA's) Instant Messaging and Presence Service (IMPS)), Yahoo! instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn farther parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along, with the field tags, which act to instruct the parser to generate queries directed to appropriate tables and/or fields In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP, Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries e.g. ActiveX, AJAX, (D)HTML, FLASH, Java, JavaScript, etc. interface libraries such as, but not limited to, Dojo, jQuery (UI), MooTools Prototype script.aculo.us, SWFObject Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution if program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself and/or facilities of the like. The cryptographic component supports encryption schemes allowing for the secure transmission of information across a communications network to enable the component of the present invention to engage in secure transactions if so desired. The cryptographic: component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

A Database of the Present Invention.

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash. (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A system for compressing and decompressing video files, comprising:
   a digital recording device configured to transfer a digital video feed to a computing device; and
   the computing device having a graphical user interface, a processor, and a computer readable non-transitory storage medium for tangibly storing thereon machine readable instructions, the machine readable instructions when executed by the processor, cause the processor to perform the steps of:
      accessing the digital video feed, wherein the digital video feed is a Real Time Streaming Protocol (RTSP) feed to a server that includes relevant file archival and compression software;
      editing, using the graphical user interface, the digital video feed by editing criteria of the digital video feed selected from the group consisting of: image quality; image resolution; and frames per second;
      converting the RTSP feed into one or more image files, wherein the number of image files is determined based on the frames per second;
      extracting a series of frames from the digital video feed, wherein each frame is converted into an image file;
      organizing a number of image files from the series of image files into a grouping of image files;
      compressing the grouping of image files into a singular compressed file,
         wherein the singular file having a singular file extension;
      storing the singular compressed file to the computing device and to a server that is remote from the computing device, creating a redundant copy of the singular compressed file;
      decompressing the singular compressed file, creating a decompressed file; extracting the number of image files from the decompressed file; and organizing the extracted number of image files into a playable video file, wherein the playable video file is played back in a sequence and enabling the user to video the reconstructed video file, wherein the reconstructed video file maintain the same quality as the series of image files prior to compression;
      creating a file index database, and organizing the series of image files from the digital video feed within the file index database wherein the file index database includes all of the individual image files that need to be processed, compressed, and archived using the software;
      searching the file index database for any image files that are to be processed by the software wherein the processing include reducing the resolution size of the individual images, altering the frames per second of the input video, altering the image quality of the individual images, cropping the individual images;
      parsing the search through a bridge mechanism into appropriate grammars to generate queries in a standard database by instantiating a search string.

2. The system as recited in claim 1, wherein the computing device uses a Lempel-Ziv-Markov chain algorithm 2 (LZMA2) compression method.

3. The system as recited in claim 1, wherein the user, with the graphical user interface, is configured to select a compressed archival file to extract image files.

4. The system as recited in claim 1, wherein the machine readable instructions when executed by the processor, cause the processor to further perform the step of:
   archiving the singular compressed file in a database located on the server and/or a remote server.

5. The system as recited in claim 1, wherein the machine readable instructions when executed by the processor, cause the processor to further perform the step of:
   playing, on the graphical user interface, the playable video file from the extracted number of image files.

6. A method for compressing and decompressing video files, comprising:
   recording, using a digital recording device, a digital video feed;
   transferring the digital video feed to a server;
   accessing, using a processor coupled to the server, the digital video feed, wherein the digital video feed is a Real Time Streaming Protocol (RTSP) feed to a server that includes relevant file archival and compression software;
   editing, using a graphical user interface, the digital video feed by editing criteria of the digital video feed selected from the group consisting of: image quality; image resolution; and frames per second;
   converting the RTSP feed into one or more image files, wherein the number of image files is determined based on the frames per second;
   extracting, using the processor, a series of image files from the digital video feed; organizing a number of image files from the series of image files into a grouping of image files;
   compressing, using the processor, the grouping of image files into a singular compressed file, wherein the singular file having a singular file extension;
   storing the singular compressed file to a computing device and to the server, creating a redundant copy of the singular compressed file,
      wherein the computing device is remote from the server;
   decompressing, using the processor, the singular compressed file, creating a decompressed file;
   extracting a series of frames from the digital video feed, wherein each frame is converted into an image file; and
   organizing the extracted number of image files into a playable video file, wherein the playable video file is played back in a sequence and enabling the user to video the reconstructed video file, wherein the reconstructed video file maintain the same quality as the series of image files prior to compression;
   creating a file index database, and organizing the series of image files from the digital video feed within the file index database wherein the file index database includes all of the individual image files that need to be processed, compressed, and archived using the software;
   searching the file index database for any image files that are to be processed by the software wherein the processing include reducing the resolution size of the individual images, altering the frames per second of the input video, altering the image quality of the individual images, cropping the individual images;

parsing the search through a bridge mechanism into appropriate grammars to generate queries in a standard database by instantiating a search string.

7. The method as recited in claim 6, wherein the compressing step includes
using a Lempel-Ziv-Markov chain algorithm 2 (LZMA2) compression method.

8. The method as recited in claim 6, further comprising:
selecting, using the graphical user interface, a file type for the series of image files.

9. The method as recited in claim 6, further comprising:
archiving the singular compressed file in a database located on the server.

10. The method as recited in claim 9, wherein the computing device houses the processor.

11. The method as recited in claim 1, further comprising: playing, on the graphical user interface, the playable video file from the extracted number of image files.

\* \* \* \* \*